UNITED STATES PATENT OFFICE.

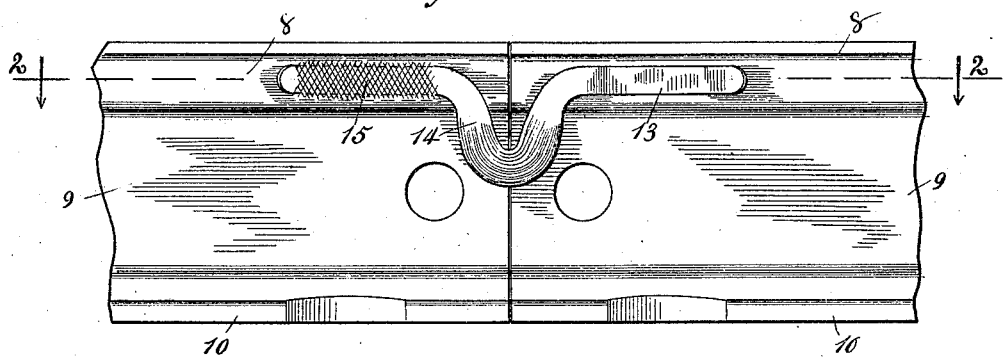
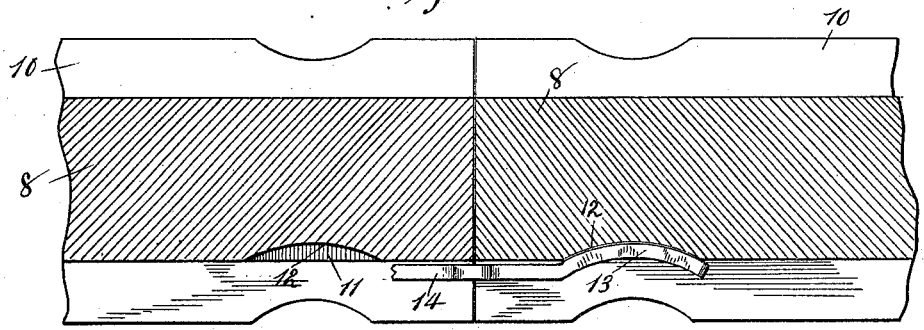
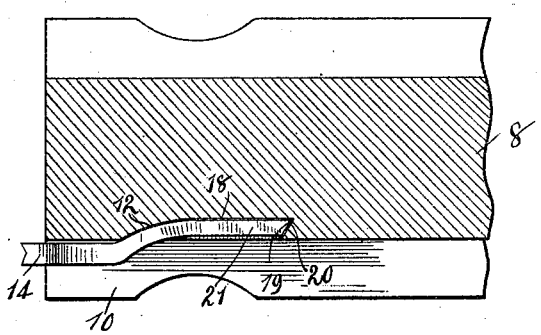
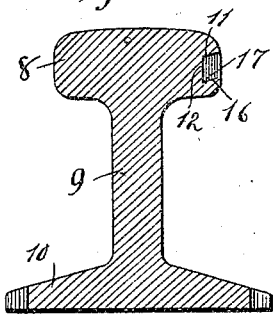

HERBERT T. WINDSOR, OF WALWORTH, WISCONSIN.

RAIL-BOND.

1,032,793.

Specification of Letters Patent.  Patented July 16, 1912.

Application filed April 16, 1909. Serial No. 490,205.

*To all whom it may concern:*

Be it known that I, HERBERT T. WINDSOR, citizen of the United States, residing at Walworth, in the county of Walworth and State of Wisconsin, have invented certain new and useful Improvements in Rail-Bonds, of which the following is a specification.

My invention relates to rail bonds of that type employed on electric railways to connect the ends of the rails, thereby forming adequate electric conductors.

The chief objects of the improvements which constitute the subject matter of this application are:—to provide in the rail an efficient seat for the rail bond.

Other objects are:—to provide means for mechanically restraining the ends of the bond, by inserting them in suitable sockets formed in the rail head, thus adding to the efficiency of the soldered union and positively preventing their becoming disengaged by the vibration to which the rails are subject even though the soldered union should break, and to furnish means for confining the solder used to join the bonding element with the rail to the immediate vicinity of the connection, thereby effecting a stronger union between the bonds and the rails than is possible where the latter are merely soldered to the plane surface of the rail head.

I accomplish the desired results by the means illustrated in the accompanying drawing forming a part of this application, the details of construction being disclosed in the following views:—

Figure 1 is a side elevation of a rail joint, showing one manner of applying the bond thereto; Fig. 2 is a sectional view taken on the line 2—2 of Fig. 1, with a portion of the bond broken away; Fig. 3 is a similar section, showing one end of a rail only, illustrating a modification of the bond seat by the formation of an undercut recess at one end thereof, and Fig. 4 is a transverse section of a rail, the cutting plane passing through one of the bond seats.

Referring to the details of the drawing, the numeral 8 indicates the heads, 9 the webs, and 10 the base of abutting rails, which are to be bonded. Adjacent the ends, each rail head is provided upon one side with a longitudinal recess or bond seat 11, which may be formed by any convenient method. The vertical or inner side wall 12 of the recess is preferably made concave, as illustrated, so that it will be adapted to receive the curved engaging end or terminal 13 of the bond member 14, so that the contacting surfaces will fit accurately together and lie in close apposition. The bonding members may be solid or laminated as preferred and when the ends 13 of the bond are thus seated in the grooves 11 they are firmly secured by the application of a suitable solder which will flow into said grooves around the side edges of the bond and will also cover the outer surface of the terminal thus forming a compact body, indicated by cross-hatching 15 in Fig. 1, thus firmly binding the ends 13 to the rail head. As the integrity and efficiency of the bond thus constructed depends largely upon the soldering process, I may make the bottom of the recess incline inwardly and downwardly toward the wall 12, as indicated at 16, Fig. 4, so as to form a trough or pocket 17 into which the solder will readily flow by gravity and accumulate in sufficient quantity to form an effective retaining body when solidified.

In Fig. 3 is shown a slight modification in the formation of the recess, the rear wall 12 being partly concaved in the manner previously described, and then made straight as indicated at 18, and the end of the recess is undercut to form a socket 19 the end wall 20 being inclined, as shown, to facilitate its construction, and the end 21 of the bonding member is suitably beveled at the extremity to conform with the shape of said socket.

It will be readily seen that when the parts are assembled, as shown, with the terminal of the bonding member engaging the recess and the socket 19, and solder properly applied in the manner mentioned, the interlocking of the end 21 with the socket wall 20 will produce an efficient union that will be strong and durable.

While I prefer to join the conductor or bonding member to the rails by soldering, it will be obvious that other methods well known in the art, for accomplishing the same purpose, may be employed, such as welding or brazing.

From the construction shown in Fig. 3, it will be obvious that the natural expansive tendency of the ends 13 of the bond due to the bend 14, will serve to retain the extremities of the bond within the undercut recess even though the soldered union should become broken by the constant jarring to which such devices are subjected.

From the construction disclosed in Figs. 1 and 2, it will be seen that the ends 13 rest upon the bottom of the recess so that they are supported against gravity, and the solder forms a retaining cover or bridge which overlaps the portions of the rail above and below the groove.

Having thus described my invention, what I claim as new, is:—

1. In combination with rails having open horizontal recesses extending longitudinally therein, the bottom walls of said recesses being curved, and the upper and lower walls of said recesses being parallel, a bonding member having its terminals adapted to conform to and fit within said recesses, and means for securing said terminals in said recesses.

2. In combination with rails having recesses therein, the bottom wall of each recess being an arc of a circle the ends of which terminate at the outer face of the rail, a bonding member having its end portions bent to conform to the shape of said recesses, and means for holding said members in position in said recesses.

In testimony whereof I affix my signature in the presence of two witnesses.

HERBERT T. WINDSOR.

Witnesses:
L. H. ROBAR,
C. M. MAXON.

Copies of this patent may be obtained for five cents each, by addressing the "Commissioner of Patents, Washington, D. C."